United States Patent [19]
Clark et al.

[11] Patent Number: 6,108,667
[45] Date of Patent: Aug. 22, 2000

[54] SYSTEM OF COMPRESSING A LOG STREAM USING A SCRATCH PAD OF LOGICALLY DELETED ENTRIES

[75] Inventors: Carl Edward Clark, Poughkeepsie; Steven Jay Greenspan, Hyde Park; Hiren Ramlal Shah, Highland, all of N.Y.

[73] Assignee: International Business Machines Corporation, Armonk, N.Y.

[21] Appl. No.: 08/828,465

[22] Filed: Mar. 28, 1997

[51] Int. Cl.[7] .......................................... G06F 9/00
[52] U.S. Cl. ............................................... 707/200
[58] Field of Search ........................... 707/1–206

[56] References Cited

U.S. PATENT DOCUMENTS

| | | | |
|---|---|---|---|
| 4,878,167 | 10/1989 | Kapulka et al. | 364/200 |
| 5,155,678 | 10/1992 | Fukumoto et al. | 395/425 |
| 5,191,651 | 3/1993 | Halim et al. | 395/200 |
| 5,280,611 | 1/1994 | Mohan et al. | 395/600 |
| 5,339,427 | 8/1994 | Elko et al. | 395/725 |
| 5,345,590 | 9/1994 | Ault et al. | 395/650 |
| 5,394,554 | 2/1995 | Elko et al. | 395/800 |
| 5,410,695 | 4/1995 | Frey et al. | 395/650 |
| 5,463,736 | 10/1995 | Elko et al. | 395/848 |
| 5,471,631 | 11/1995 | Beardsley et al. | 395/650 |
| 5,493,668 | 2/1996 | Elko et al. | 395/457 |
| 5,537,574 | 7/1996 | Elko et al. | 395/468 |
| 5,737,600 | 4/1998 | Geiner et al. | 707/200 |

OTHER PUBLICATIONS

"MVS Programming Assembler Services Reference", IBM Publication No. GC28–1910–01, Sep. 1996.

"MVS Programming Assembler Services Guide", IBM Publication No. GC28–1762–01, Sep. 1996.

"LRAID: Use of Log Disks for an Efficient RAID Design," IBM Technical Disclosure Bulletin, vol. 37, No. 02A, pp. 19–20 (Feb. 1994).

*Primary Examiner*—Paul R. Lintz
*Assistant Examiner*—John G. Mills, III
*Attorney, Agent, or Firm*—Heslin & Rothenberg, P.C.; William A. Kinnaman, Jr., Esq.

[57] ABSTRACT

Managing a log stream of a computer system. An entry of a log stream, desired to be removed from the log stream, but not eligible for removal, is logically deleted. Logical deletion keeps the entry on the log stream and indicates that the entry can be removed from the log stream when it is eligible. When the entry is eligible, it is removed. If a desired entry remains at the tail of the log stream for a given period of time, thus not allowing the removal of one or more undesired entries, the desired entry is rewritten to the head of the log stream and deleted from the tail. Thereafter, other logically deleted entries eligible for deletion are removed from the log stream.

16 Claims, 7 Drawing Sheets

|   | LD BLOCK ID | NEXT LDE ENTRY |
|---|---|---|
| 1 | 002 | 3 |
| 2 | 003 | 4 |
| 3 | 005 | 4 |
| 4 | 009 | 6 |
| 5 | 004 | 7 |
| 6 | 010 |   |
| 7 | 007 |   |
| ⋮ |   |   |
| nn |   |   | fig. 3a

|   | RM NAME | LDE INDEX |
|---|---|---|
| 1 | RM2 | 1 |
| 2 | RM1 | 2 |
| 3 | RM3 | 5 |
| ⋮ |   |   |
| nn |   |   | fig. 3b

| | LD BLOCK ID | NEXT LDE ENTRY |
|---|---|---|
| 1 | | |
| 2 | | |
| 3 | | |
| 4 | 009 | 6 |
| 5 | | |
| 6 | 010 | |
| 7 | 007 | |
| ⋮ | | |
| nn | | | fig. 5a

| | RM NAME | LDE INDEX |
|---|---|---|
| 1 | RM2 | 4 |
| 2 | | |
| 3 | RM3 | 7 |
| ⋮ | | |
| nn | | | fig. 5b

SYSTEM OF COMPRESSING A LOG STREAM USING A SCRATCH PAD OF LOGICALLY DELETED ENTRIES

TECHNICAL FIELD

This invention relates, in general, to the management of a log stream and, in particular, to the deleting of unnecessary entries from the log stream and to the compressing of the log stream.

CROSS REFERENCE TO RELATED APPLICATIONS

This application contains subject matter which is related to the subject matter of the following application, which is assigned to the same assignee as this application and filed on the same day as this application. The below listed application is hereby incorporated herein by reference in its entirety:

"Tail Compression Of A Log Stream Using A Scratch Pad Of Logically Deleted Entries," by Clark et al., Ser. No. 08/827,560, (Docket No. PO9-96-094).

BACKGROUND ART

In various computer systems, historical log data is maintained (for example, in log files) for use in system recovery, problem determination and/or system maintenance. Typically, these log files have a limited amount of capacity to retain the historical data. After the capacity is met, at least some of the data records are moved from the log files to external storage devices, such as direct access storage devices (DASD), thereby providing additional space in the log file for more data.

At some point, data within the log file and/or on the external storage devices are no longer needed. For example, there is no need to keep the data once it passes its retention requirements. The saving of data past its usefulness adversely affects system performance in a number of ways. For example, when unnecessary data is retained and the log file needs to be browsed to recover logged data during recovery of a failure, the browser may have to deal with potentially large amounts of unnecessary data, thereby slowing down the recovery process. Additionally, when the saving of unwanted data records requires the use of external storage devices, which typically provide slower access to the data, the reading of the data takes longer, thus, affecting system performance.

Therefore, it is beneficial to delete any unnecessary data from the log files. However, generally, there are a number of restrictions placed on what data can be deleted. In one example, data may only be deleted from the tail of the log file. Thus, if the data record at the tail is still necessary, then no data can be deleted from the log file. This forces the saving of many unnecessary or unwanted data records.

The above problem is exacerbated when a log file is shared by multiple systems and the data record at the tail is owned by a system that has failed. In that case, the data record may not be deleted for a very long time, if at all, causing the saving of an increasing number of unwanted data records.

Thus, a need exists for a technique that allows the removal of unnecessary data records from a log file, even when the data record at the tail is still wanted. A further need exists for a technique that allows the removal of data records by the non-owner of the data records. A yet further need exists for a log management capability that can compress a log file in an efficient manner.

SUMMARY OF THE INVENTION

The shortcomings of the prior art are overcome and additional advantages are provided through the provision of a system of managing a log stream. The system includes, for example, means for identifying an entry of the log stream that is not eligible for removal from the log stream; and a processor adapted to logically delete the entry from the log stream. The logical deletion keeps the entry on the log stream and indicates that the entry can be removed from the log stream when it is eligible to be removed.

In one example, the system includes a scratch pad adapted to indicate the logical deletion of the entry. The scratch pad is separate from the log stream.

In a further example, the processor is also adapted to remove the entry from the log stream when the entry is eligible for removal. In one embodiment, the processor includes a resource manager not owning the entry, and the resource manager is adapted to initiate the removal of the entry from the log stream.

In another aspect of the present invention, a system of managing a log stream is provided, which includes means for logically deleting one entry from the log stream when the entry is ineligible for removal from the log stream; means for removing another entry from the log stream, in which the removing causes the one entry to be eligible for removal; and means for removing the one entry from the log stream, subsequent to removal of the another entry.

In yet a further aspect of the present invention, a system of managing a log stream is provided which includes a resource manager adapted to initiate a rewrite of a first entry from one location of the log stream to another location of the log stream, when the first entry is to at least temporarily remain on the log stream. The resource manager is further adapted to initiate deletion of the first entry from the one location.

The log management capability of the present invention advantageously provides for the logical deletion of unnecessary log entries on a log stream, such that the logically deleted entries can subsequently be removed from the log stream by any resource manager connected to the log stream. The technique of the present invention allows the removal of unnecessary data records from the log stream, even when the entry at the tail is still wanted. The invention advantageously provides for the rewriting of the entry at the tail to another location within the log stream, so that unnecessary entries can be deleted. Additionally, the log management capability of the present invention enables the efficient compression of the log stream, in which additional log streams are not necessary.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 3a depicts one example of a logical deletion vector of the computer system of FIG. 1, in accordance with the principles of the present invention;

FIG. 3b depicts one embodiment of a resource management vector of the computer system of FIG. 1, in accordance with the principles of the present invention;

FIGS. 5a–5b depict an updated logical deletion vector and an updated resource management vector, respectively, in accordance with the principles of the present invention;

BEST MODE FOR CARRYING OUT THE INVENTION

In accordance with the principles of the present invention, a log stream management capability is provided in which tail compression is performed on a log stream of a computer system without requiring the creation of other log streams. A scratch pad is maintained within the computer system to identify logically deleted, but not yet physically deleted entries, and this scratch pad is used during the tail compression, as described herein.

Figure 1:
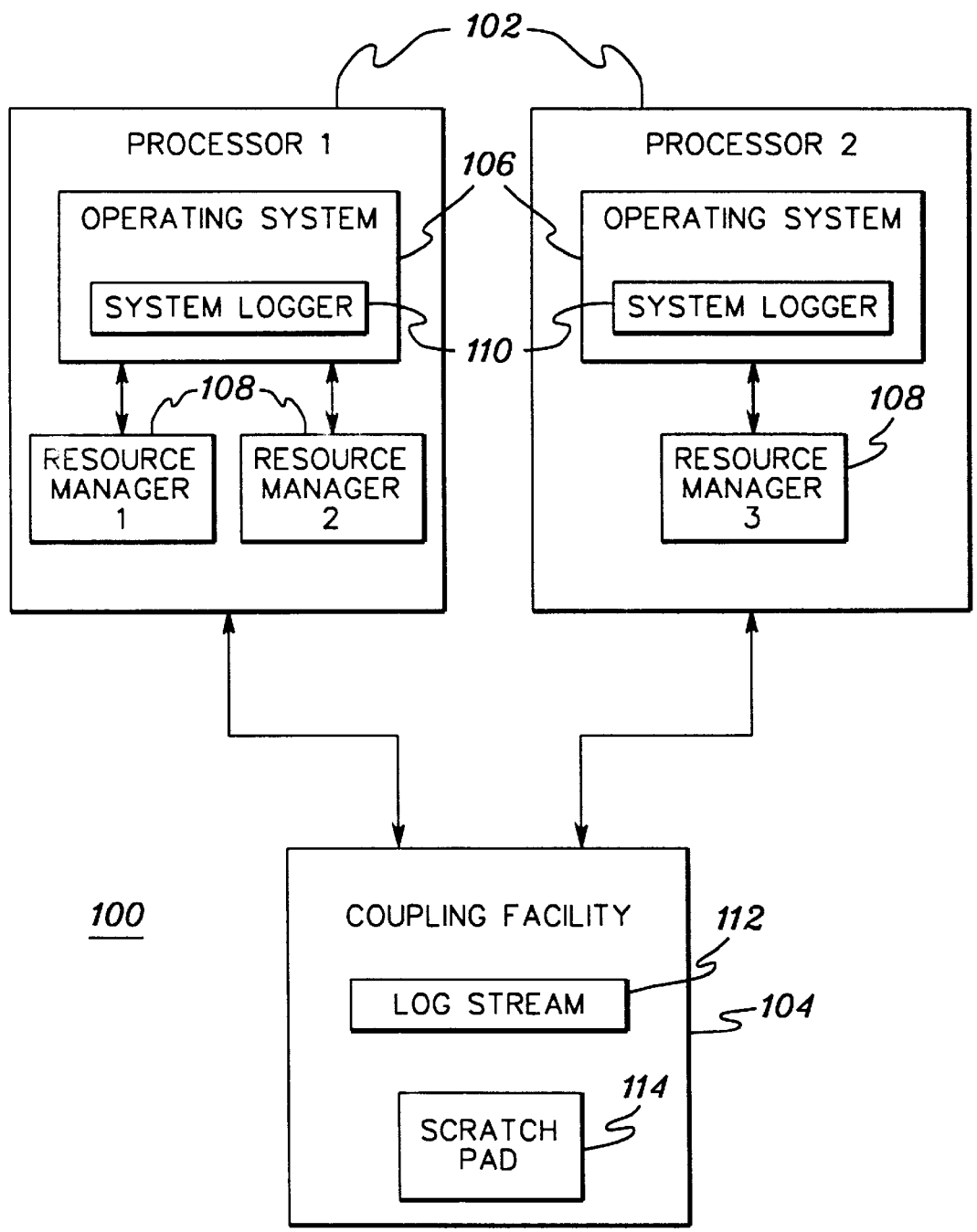
FIG. 1 depicts one example of a computer system incorporating and using the log stream management capability of the present invention.

One example of a computer system incorporating and using the log stream management capability of the present invention is depicted in FIG. 1 and described in detail herein. In one example, computer system 100 is based on the Enterprise Systems Architecture (ESA)/390 offered by International Business Machines Corporation, and includes one or more processors 102 coupled to a coupling facility 104. Each processor 102 includes an operating system 106 and one or more resource managers 108, each of which is described below.

In one embodiment, operating system 106 is, for instance, the Multiple Virtual Storage (MVS) operating system offered by International Business Machines Corporation (or the OS/390 operating system offered by International Business Machines Corporation), and includes a system logger component 110. In particular, in one example, the system logger runs in its own address space started by the operating system. The system logger is used for the log stream management capability of the present invention, as described below, and one embodiment of a system logger is described in MVS Programming Assembler Services Reference, IBM Publication No. GC28-1910-01 (September 1996); and MVS Programming Assembler Services Guide, IBM Publication No. GC28-1762-01 (September 1996), each of which is hereby incorporated herein by reference in its entirety.

Each of resource managers 108 owns and controls a set of resources within the computer system. For example, a resource manager can be a database management facility, such as IMS or DB2, or a communications facility such as Advanced Programming To Programming Communications (APPC), all of which are offered by International Business Machines Corporation.

As mentioned above, each processor is coupled to coupling facility 104. Coupling facility 104 is a shareable facility that contains storage accessible by the processors and performs operations requested by the resource managers and/or programs running within the processors. In one embodiment, coupling facility 104 is a structured-external storage processor (SES). Examples of a coupling facility are described in detail in U.S. Pat. No. 5,317,739, entitled "Method and Apparatus for Coupling Data Processing Systems," by Elko et al., issued May 31, 1994, and in U.S. patent application Ser. No. 08/632,683 entitled, "Method And System For Log Management In A Coupled Data Processing System," by Geiner et al., filed on Apr. 15, 1996, both assigned to International Business Machines Corporation, and each of which is hereby incorporated herein by reference in its entirety.

In accordance with the principles of the present invention, coupling facility 104 includes a log stream 112. (Coupling facility 104 may include a plurality of log streams, and one or more of those log streams can be managed, in accordance with the principles of the present invention.) In one example, log stream 112 is accessible by each of the processors and capable of containing one or more entries for each of the processors. In one embodiment, at least a portion of log stream 112 can be stored in one or more storage devices (e.g., direct access storage devices (DASD)), when, for example, sufficient space for the log stream no longer exists within the coupling facility.

One example of a log stream and various services corresponding to the log stream are described in detail in U.S. patent application Ser. No. 08/632,683 entitled, "Method And System For Log Management In A Coupled Data Processing System," by Geiner et al., filed on Apr. 15, 1996, which is hereby incorporated herein by reference in its entirety.

One example of the components of log stream 112, used for the present invention, are described in detail with reference to FIG. 2. In one embodiment, log stream 112 includes a number of log blocks or log entries 200, each having a respective block identifier 202. Each block identifier corresponds to, for instance, a relative offset into the log stream. Data and other various information may also be included in the log stream, but need not be discussed for the present invention.

Figure 2:
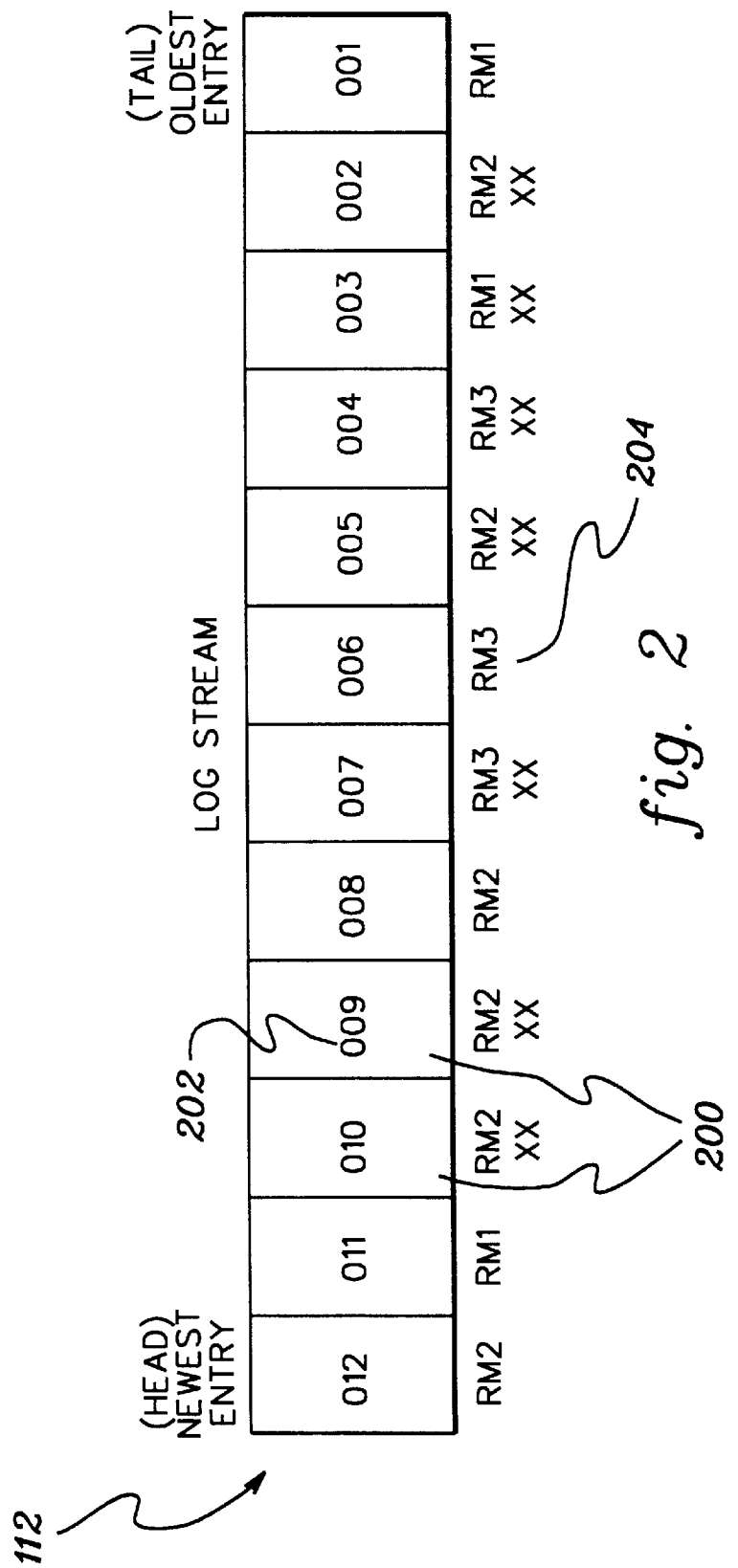
FIG. 2 depicts one example of a log stream of the computer system of FIG. 1, in accordance with the principles of the present invention.

In addition to the above, FIG. 2 depicts for each log entry an identifier 204 of the resource manager owning that log entry. For example, in the log stream of FIG. 2, the identifier "RM2" identifies that Resource Manager 2 owns the log entry corresponding to block identifier "005." Furthermore, "XX" indications are included for various log blocks, which indicate that those entries are logically deleted, as described more fully below. The identifiers 204 and the XX markings do not appear in the log stream, but are shown in FIG. 2 for illustrative purposes, only.

One end of log stream 112 is referred to herein as the tail or rear of the log stream. In one embodiment, the rear of the log stream typically includes the oldest entry of the log stream (i.e., the entry with the oldest block id). The other end of the log stream is referred to herein as the head, which is forward from the tail or rear. (In another embodiment, it may be the head instead of the tail, which typically holds the oldest entry. The present invention equally applies to such a log stream.)

The log stream described above is only one example. In another embodiment, the log stream can include log data for just a single system. Additionally, the log stream need not be included in a coupling facility. It can be, for instance, located in main storage, a cache, auxiliary storage, external storage devices, or any combination thereof.

A computer system can have various log streams, including multisystem or single log streams, or a combination of both, and one or more of those log streams can be managed in accordance with the principles of the present invention. The log stream of a system can be stored in one medium or a combination of various media, including but not limited to, a coupling facility, main storage, a cache, auxiliary storage, or external storage devices.

Referring back to FIG. 1, in one example, according to the present invention, coupling facility 104 further includes a scratch pad 114 that is used by the log management capability of the present invention, as described herein. In one example, the scratch pad is created by the first system logger that attempts to read the scratch pad. In one embodiment, scratch pad 114 includes two vectors: a logical deletion vector 300 (FIG. 3a), and a resource management vector 302 (FIG. 3b), each of which is described in detail herein.

In one embodiment, logical deletion vector 300 includes a number of entries 302 that have been logically deleted from log stream 112, but not yet physically deleted (removed), as described in detail below. Each entry 302 includes, for instance, a block id 304, which corresponds to block id 202 of the log entry to be deleted, and a next LDE index 306, which is an index to the next logically deleted entry for that resource manager, if there is one. For example, entry 3 of vector 300 (FIG. 3a) indicates that block identifier "005" has been logically deleted. Entry 3 of vector 300 further indicates that the next logically deleted entry for the resource manager owning block id 005 is at entry 4 of vector 300. Entry 4 corresponds to block id 009. This corresponds to FIG. 2, in which block id 005, marked as XX, is owned by RM2 and the next block id owned by RM2, marked with XX, is block id 009.

As mentioned above, in one embodiment, scratch pad 114 further includes resource management vector 302, one example of which is depicted in FIG. 3b. Resource management vector 302 includes one or more entries 308, and each entry includes, for example, an identifier 309 and an LDE index 310. Identifier 309 identifies the name of the resource manager owning the log block corresponding to the block id of vector 300 specified by index 310. For example, entry 3 of vector 302 indicates that Resource Manager 3 owns the block id represented in entry 5 of vector 300 (i.e., block id 004).

In accordance with the principles of the present invention, resource manager vector 302 includes only one entry for each resource manager having logically deleted entries on the log stream. In particular, it includes the most rearward logically deleted entry for the resource manager. In order to find the chain of logically deleted entries for a particular resource manager, logical deletion vector is used.

In accordance with the principles of the present invention, scratch pad 114 is used in the logical deletion of entries from log stream 112. In one embodiment, entries are logically deleted from the log stream when they are no longer needed but cannot be physically deleted or removed from the log stream for one reason or another. For example, if an entry is not at the tail (rear) of the log stream (e.g., block id 002 of FIG. 2), then it cannot be physically deleted, even if it is no longer needed. Additionally, as another example, if the entry to be deleted is the only entry on the log stream, then it also cannot be physically deleted. Thus, it would be logically deleted, in accordance with the present invention.

Figure 4:
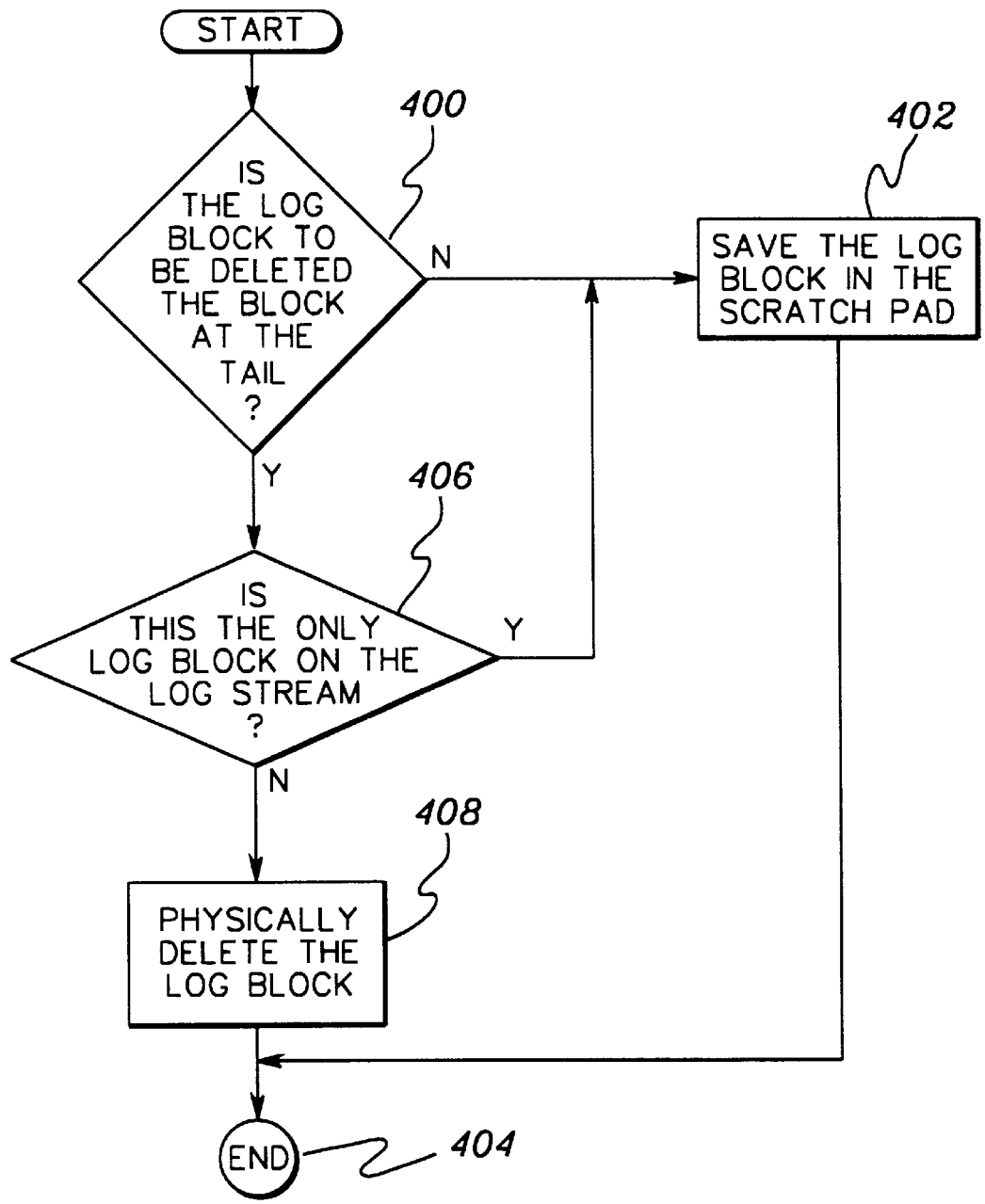
FIG. 4 depicts an embodiment of the logic used to logically delete an entry from the log stream of FIG. 2, in accordance with the principles of the present invention.

One embodiment of the logic used to logically delete an entry from log stream 112 is depicted in FIG. 4 and described in detail herein. Referring to FIG. 4, initially, an inquiry is made as to whether the log block to be deleted (i.e., either physically or logically) from the log stream is at the rear (tail) of the log stream, INQUIRY 400. In particular, one of the resource managers determines that it no longer needs one or more blocks on the log stream. Thus, the resource manager checks to see if the oldest block it no longer needs is the block at the tail of the log stream. In one example, this check is made by requesting from the system logger the id of the block at the tail.

If the log entry is not at the tail, then the entry cannot be physically deleted (i.e., removed), so it is logically deleted by the resource manager writing information corresponding to the log entry to scratch pad 114. In particular, the block id of the block to be logically deleted is stored in vector 300 and its corresponding resource manager, if this is the first logically deleted block for that resource manager, is stored in vector 302. If there is another entry in vector 300 for the same resource manager, then an indication of such will be made in the column labelled "NEXT LDE ENTRY." Thereafter, logical deletion of the block is complete, STEP 404.

If, on the other hand, the log block to be deleted, INQUIRY 400, is the block at the tail of the log stream, then a further determination is made as to whether it is the only log block on the log stream, INQUIRY 406. If it is, then it cannot be physically deleted, so it is logically deleted, as described above, STEP 402.

However, when the log block to be deleted is the log block at the rear of the log stream and it is not the only log block on the log stream, the log block is physically deleted, STEP 408. In one example, physical deletion is carried out by system logger 110, which is informed of the block to be deleted by the resource manager wanting to delete the block. One example of physical deletion of a log block is described in detail in MVS Programming Assembler Services Reference GC28-1910-01; and MVS Programming Assembler Services Guide GC28-1762-02, each of which is hereby incorporated herein by reference in its entirety. Thereafter, deletion of the log block is complete, STEP 404.

In one aspect of the present invention, the resource manager instructing the physical deletion of the rearmost log entry, can further have one or more additional logically deleted entries, as identified by the scratch pad, physically deleted by the system logger. In particular, when the owning resource manager deletes its log entry, it determines by examination of logical deletion vector 300 that one or more other entries have been logically deleted, and thus, can be physically deleted. In one embodiment, these entries are organizationally contiguous blocks in the log stream to the most rearward entry. As one example, if block id 001 is deleted from log stream 112 of FIG. 2, then block ids 002–005 can also be deleted, even though those blocks may be owned by a different resource manager. In one embodiment, all of these blocks can be deleted only if there still remains one log block on the log stream, which is true in this one particular example. Once these blocks are deleted, block id 006 becomes the new rear of the log stream.

In another aspect of the present invention, whenever any of resource managers 108 initiates physical deletion and/or logically deletes log entries 200, the particular resource manager updates logical deletion vector 300 and/or resource management vector 302, to accurately reflect the deletion by that particular resource manager. This updating preferably occurs after physical deletion of the rearmost log entry, as well as after any continuation of the physical deletion with respect to logically deleted entries 302, as discussed above. Examples of vectors 300 and 302 after they are updated to reflect the deletion of block ids 001–005 are depicted in FIGS. 5a, 5b, respectively.

In accordance with the principles of the present invention, if the resource manager owning the entry at the tail of the log stream needs to retain that entry for a long period of time, it is possible that one or both of the logically deleted entry vector and the resource manager vector will fill up. To prevent this situation, a threshold point is established. The threshold value is, for example, 50% of the capacity of the logically deleted entry vector. In one embodiment, the threshold value or limit is stored within the coupling facility and thus, accessible by each of the resource managers coupled to the coupling facility. (In another embodiment, copies of the threshold value can be stored within each processor, instead of or in addition to the coupling facility. In yet another embodiment multiple threshold values can be stored within the coupling facility and/or within the processors and used, as described herein.) The threshold value is used in determining when the log stream is to be compressed, as described in detail with reference to FIG. 6.

Figure 6:
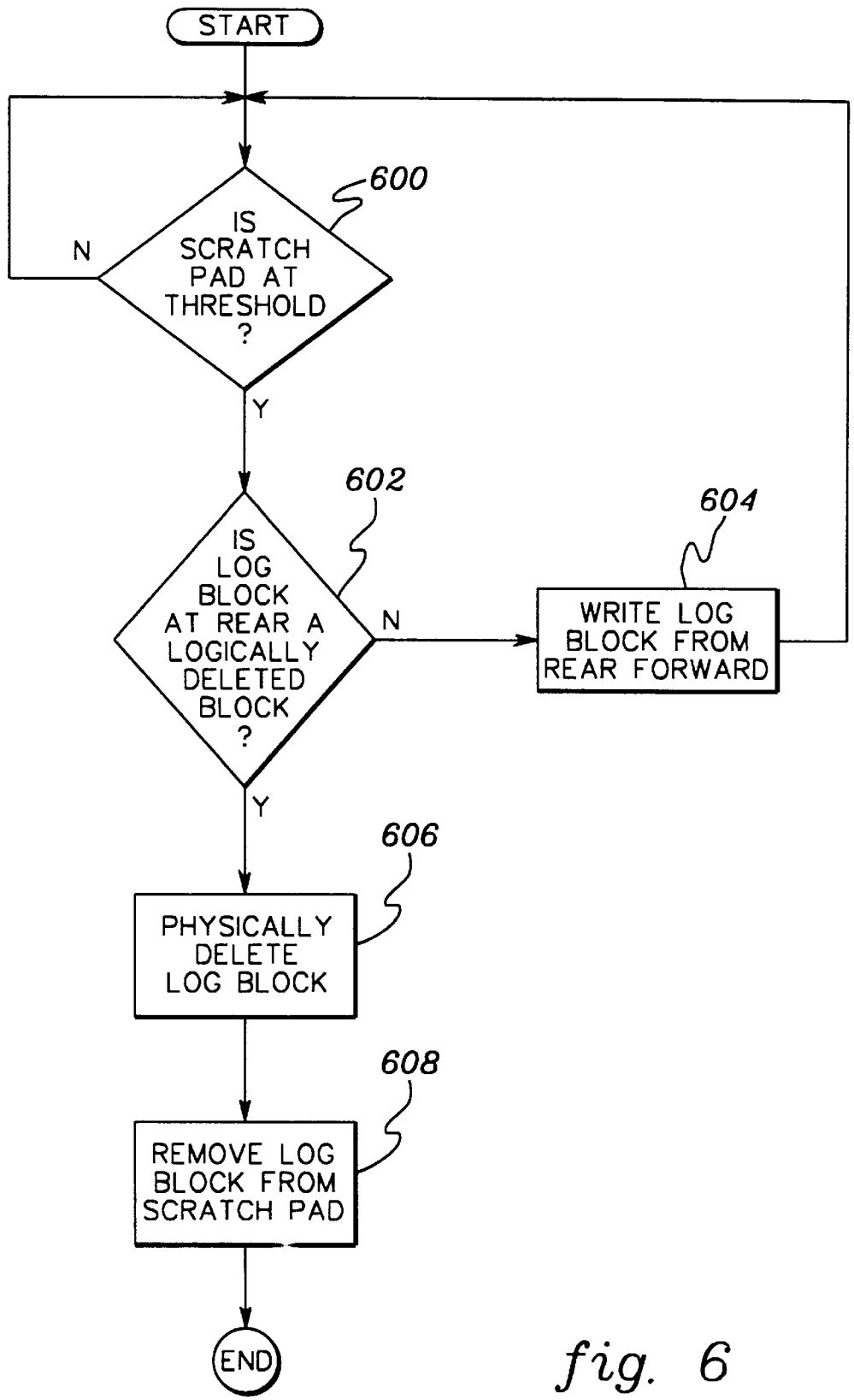
FIG. 6 depicts one embodiment of the logic used to compress the log stream of FIG. 2, in accordance with the principles of the present invention.

One example of the logic used in compression of the log stream is depicted in FIG. 6 and described in detail herein. Initially, a determination is made as to whether the capacity of the scratch pad has reached a preselected relationship with respect to the threshold value, INQUIRY 600. This preselected relationship can include, for example, a determination that the logical deletion vector has reached or exceeded its preselected threshold value of, for example, fifty percent. If the scratch pad has not reached its preselected limit, then processing flows back to INQUIRY 600 to repeat the determination at preselected time intervals.

In particular, in one example, a compression timer established by each resource manager, when the resource manager connects to the log stream, pops every 5 seconds, as one example, thereby informing the resource manager to check whether the entry at the tail is owned by that resource manager. If it is, then that resource manager checks the logical deletion vector against the threshold. When the owning resource manager detects that the threshold has been reached, it performs the compression described below.

When the limit has been reached, a further determination is made as to whether the log block at the rear or tail of the log stream represents a logically deleted block, INQUIRY 602. This determination is made by the owning resource manager, which, in one example, checks to see whether the log block at the rear of the log stream is included in logically deleted entry vector 300.

When the log block at the rear has not been logically deleted, the log block at the rear is written forward of the rear, STEP 604. In one embodiment, the resource manager initiates the rewriting of the log entry to the head of the log stream (i.e., the least rearward position in the log stream), gives the rewritten log entry a new block id, and initiates the deleting of the original entry off of the tail. (In one example, the system logger does the physical writing and deleting from the log stream under instruction of the resource manager.) When an entry is given a new block id, it is considered herein as a new entry, even though the data located in the entry may be older than the data of other entries.

Figure 7:
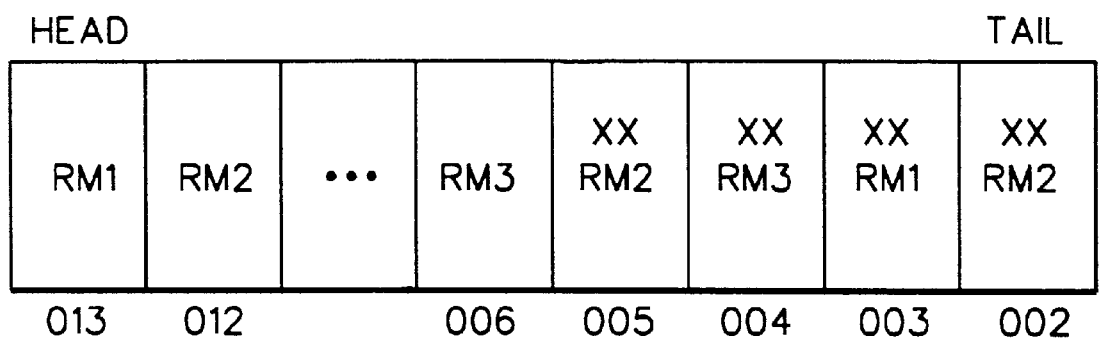
FIG. 7 depicts one example of a log stream in which an entry at the tail of the log stream has been moved forward of the tail, in accordance with the principles of the present invention.

As one example, since block id 001 of FIG. 2 has not been logically deleted, it is moved to the head, as shown in FIG. 7. Thereafter, processing continues at INQUIRY 600, "IS SCRATCH PAD AT THRESHOLD?"

However, when the rear block is a logically deleted block (such as block id 002 of FIG. 7 after, for instance, block id 001 has been moved to the head), then that block is physically deleted, as described above, STEP 606. Subsequently, the log block is removed from scratch pad 114, as described above, STEP 608.

In one embodiment of the present invention, physical deletion of the other logically deleted entries at the rear (e.g., block ids 003–005) continues until there are no further logically deleted entries at the rear, and as long as one entry remains in the log stream. However, in another embodiment, the physical deletion occurs only until the logical deletion vector falls below its prespecified limit.

In a further aspect of the present invention, if the resource manager owning the entry at the tail loses its connection to the log stream due to, for instance, system failure or resource manager failure, one of the other resource managers connected to the log stream will detect this situation by determining that the entry at the tail is still the same after two consecutive compression cycles (using, e.g., a counter). Thus, the resource manager detecting this situation will have the block rewritten to the head of the log stream, as described above, after obtaining global serialization of the computer system (e.g., SCOPE(SYSTEMS)ENQ). This take over mechanism allows performance of the tail compression using just one multisystem log stream.

Described above in detail is a log management facility that enables tail compression to be performed on a multi-system log stream by any of the resource managers connected to the log stream. The tail compression does not require the creation or maintenance of another log stream, nor an increase in the size of the log stream. Instead, it uses a scratch pad to keep track of logically deleted entries, some of which may be physically deleted during the compression. Additionally, the present invention permits tail compression for entries owned by failed resource managers.

The computer system described above is only one example. The present invention can be used and/or incorporated within other systems or environments without departing from the spirit of the present invention. For example, different architectures and/or operating systems can be used without departing from the spirit of the present invention. As a further example, each processor can include one or more operating systems. As another example, one or more central processing complexes is coupled to the coupling facility, and each central processing complex includes one or more central processing units, which executes an operating system. Further, in another embodiment, the computer system can include multiple coupling facilities and/or multiple scratch pads. Additionally, the present invention is applicable to computer systems with only one processor and with systems that do not include a coupling facility. In yet a further embodiment, the system logger can be a separate component from the operating system. Again, the computer system described herein is only one example.

As described above, a log stream includes one or more datum (e.g., log data). Thus, other entities that include one or more datum are included within the definition of a log stream. These entities include, but are not limited to, log files and log data sets.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of managing a log stream comprising:
   means for identifying an entry of said log stream that is not eligible for physical removal from said log stream, wherein said means for identifying comprises means for determining whether said entry is ineligible for physical removal, said means for determining comprising:
      means for determining whether said entry is located at one end of said log stream; and
   means for determining, when said entry is at said one end, whether said entry is an only entry of said log stream, wherein said entry is not eligible for physical removal when it is not at said one end or when it is said only entry; and
      a processor adapted to logically delete said entry from said log stream, said logical deletion keeping said entry on said log stream and indicating that said entry can be physically removed from said log stream when it is eligible to be physically removed.

2. The system of claim 1, further comprising a scratch pad adapted to indicate said logical deletion of said entry, said scratch pad being separate from said log stream.

3. The system of claim 2, wherein said scratch pad comprises:
   a logical deletion vector comprising an identifier of said entry; and
   a resource manager vector comprising an identification of a resource manager owning said entry.

4. The system of claim 1, wherein said one end is a tail of said log stream.

5. A system of managing a log stream comprising:
   means for logically deleting one entry from said log stream when said entry is ineligible for physical removal from said log stream, said logical deleting comprising keeping said entry on said log stream and indicating that said entry can be physically removed from said log stream when it is eligible for physical removal;
   means for removing another entry from said log stream, said removing causing said one entry to be eligible for physical removal; and
   means for physically removing said one entry from said log stream, subsequent to removal of said another entry, wherein said means for physically removing said one entry comprises a resource manager, not owning said one entry, initiating said physical removal.

6. The system of claim 1, wherein said processor is further adapted to physically remove said entry from said log stream when said entry is eligible for physical removal.

7. The system of claim 6, wherein said processor comprises a resource manager not owning said entry, said resource manager being adapted to initiate said Physical removal of said entry from said log stream.

8. The system of claim 6, wherein said processor is further adapted to physically remove from said log stream one or more additional entries previously logically deleted from said log stream, when said one or more additional entries is eligible for physical removal.

9. The system of claim 6, further comprising one or more resource managers adapted to initiate physical removal from said log stream of one or more additional entries previously logically deleted from said log stream, when said one or more additional entries is eligible for physical removal.

10. The system of claim 9, wherein at least one resource manager does not own at least one of the entries it is initiating the physical removal thereof.

11. The system of claim 6, further comprising a scratch pad of logically deleted entries, said scratch pad updated to remove any indication within said scratch pad of said entry, after said physical removal.

12. The system of claim 1, further comprising a resource manager adapted to initiate physical removal of said entry from said log stream when said entry is eligible for physical removal.

13. The system of claim 1, wherein said one end is a tail of said log stream.

14. A system of managing a log stream comprising:
   means for logically deleting one entry from said log stream when said entry is ineligible for physical removal from said log stream, said logical deleting comprising keeping said entry on said log stream and indicating that said entry can be physically removed from said log stream when it is eligible for physical removal;
   means for removing another entry from said log stream, said removing causing said one entry to be eligible for physical removal; and
   means for physically removing said one entry from said log stream, subsequent to removal of said another entry.

15. The system of claim 14, further comprising means for physically removing any other previously logically deleted entries from said log stream that are eligible for physical removal.

16. The system of claim 15, wherein said means for physically removing of any other previously logically deleted entries comprises a resource manager initiating physical removal of at least one entry of said previously logically deleted entries, said resource manager not owning said at least one entry.

* * * * *

UNITED STATES PATENT AND TRADEMARK OFFICE
CERTIFICATE OF CORRECTION

PATENT NO. : 6,108,667
DATED : August 22, 2000
INVENTOR(S) : Clark et al.

It is certified that error appears in the above-identified patent and that said Letters Patent is hereby corrected as shown below:

Delete Claim 4 and replace with:
-- 4. The system of claim 2, further comprising at least one other processor and a shareable coupling facility coupled to said processor and said at least one other processor, and wherein said scratch pad is located within said shareable coupling facility. --

Delete Claim 5, and replace with:
-- 5. The system of claim 4, wherein said shareable coupling facility further comprises at least a portion of said log stream, and wherein said log stream is shareable by said processor and said at least one other processor. --

Signed and Sealed this

Eighteenth Day of December, 2001

Attest:

JAMES E. ROGAN
Attesting Officer     Director of the United States Patent and Trademark Office